US008220602B2

(12) United States Patent
Grabher

(10) Patent No.: US 8,220,602 B2
(45) Date of Patent: Jul. 17, 2012

(54) DEVICE FOR DAMPING OR DECELERATING MOVABLE PARTS OR PIECES OF FURNITURE

(75) Inventor: Guenter Grabher, Fussach (AT)

(73) Assignee: Alfit AG, Goetzis (AT)

( * ) Notice: Subject to any disclaimer, the term of this patent is extended or adjusted under 35 U.S.C. 154(b) by 1157 days.

(21) Appl. No.: 11/570,554

(22) PCT Filed: Jun. 9, 2005

(86) PCT No.: PCT/EP2005/006189

§ 371 (c)(1), (2), (4) Date: Dec. 13, 2006

(87) PCT Pub. No.: WO2005/124185

PCT Pub. Date: Dec. 29, 2005

(65) Prior Publication Data

US 2007/0175717 A1 Aug. 2, 2007

(30) Foreign Application Priority Data

Jun. 16, 2004 (DE) ..................... 20 2004 009 535 U

(51) Int. Cl.
*F16F 9/34* (2006.01)

(52) U.S. Cl. ................ 188/282.1; 188/322.15; 188/288; 188/314

(58) Field of Classification Search .................. 188/281, 188/282.1, 282.5, 282.8, 283, 284, 288, 297, 188/313, 314, 316, 317, 322.15, 322.22; 267/124, 129; 16/58; 312/333, 319.1
See application file for complete search history.

(56) References Cited

U.S. PATENT DOCUMENTS 5,507,070 A 4/1996 Spyche, Jr. et al.
5,634,776 A 6/1997 Leemhuis et al.
6,390,457 B1 5/2002 Roper
2003/0000781 A1* 1/2003 Oliver et al. ............... 188/267.2
2003/0075845 A1* 4/2003 Krammer .................. 267/64.11

FOREIGN PATENT DOCUMENTS

DE 38 10 841 A1 10/1988
DE 201 07 426 U1 4/2001
DE 69611839 T 8/2001
DE 203 07 522 U1 9/2004

(Continued)

*Primary Examiner* — Robert A Siconolfi
*Assistant Examiner* — Vu Q Nguyen
(74) *Attorney, Agent, or Firm* — Norris, McLaughlin & Marcus, P.A.

(57) ABSTRACT

Damping movement device of pieces of furniture which are movable relative to stationary parts. The device has a cylinder with a piston movable in a longitudinal direction, forming a modifiable working chamber filled with liquid medium. The liquid medium is transferred in a throttled manner. A piston rod is sealingly guided and connected to one side of the piston. The movement of the parts of furniture which is to be damped is transmitted to the piston via the outer end of the piston rod facing away from the piston. A volume compensating mechanism is provided. The piston rod is coupled to the piston with overflow ports. The non-return disk with overflow port is moved into sealing contact with the facing piston face. A spring biasing the facing faces of the non-return disk and the piston into the spaced-apart position is arranged between the non-return disk and the piston.

10 Claims, 3 Drawing Sheets

28 26 18 46 44 48 12a 42 24 22 10 12 40 38 36 34 39 30 14 20 32 16 6

FOREIGN PATENT DOCUMENTS

| | | | | |
|---|---|---|---|---|
| EP | 1 162 338 | A2 | | 12/2001 |
| EP | 1 215 414 | A | | 6/2002 |
| EP | 1 221 559 | A2 | | 7/2002 |
| EP | 1 437 524 | A | | 7/2004 |
| EP | 1437524 | A1 | * | 7/2004 |
| GB | 2 122 305 | A | | 1/1984 |
| JP | 02 102939 | A | | 4/1990 |
| WO | 03/081077 | A1 | | 10/2003 |

* cited by examiner 28
26
18
24
46
44
48
12a
42
22
10
12
40
38
36
39
34
30
14
20
32
16
6
3

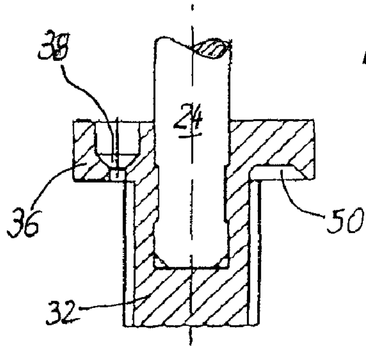
Fig. 7
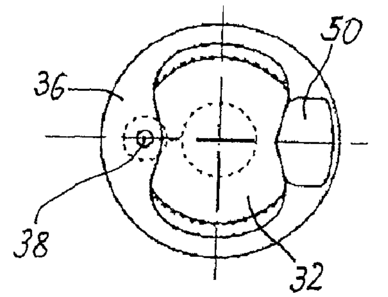
Fig. 8
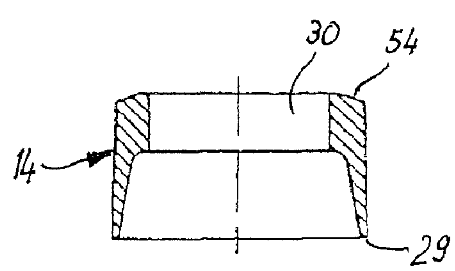
Fig. 9
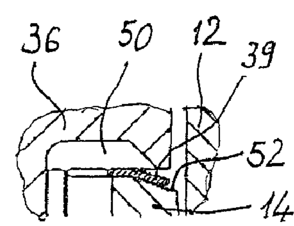
Fig. 12
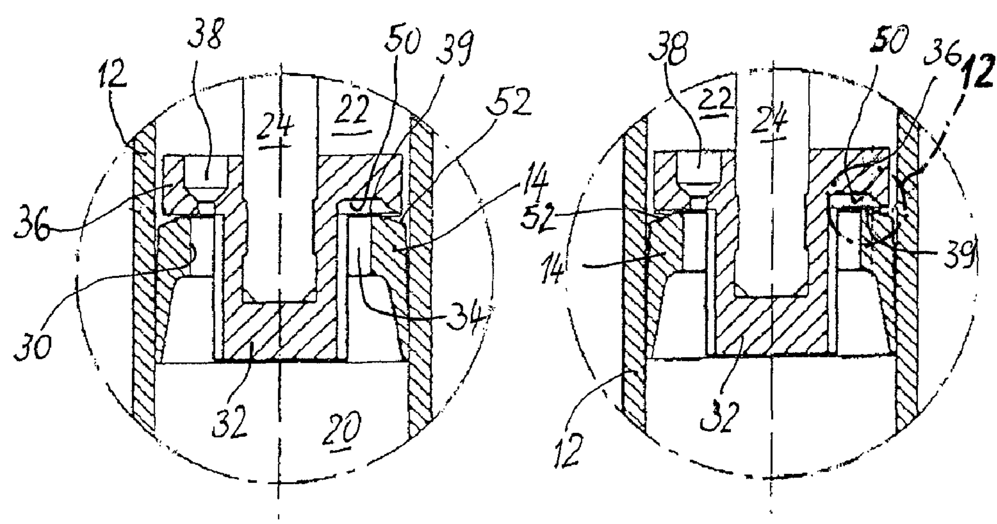
Fig. 10
Fig. 11

DEVICE FOR DAMPING OR DECELERATING MOVABLE PARTS OR PIECES OF FURNITURE

The invention relates to a device for damping or slowing the movement of furniture parts, which are movable relative an immovable furniture parts, during a portion of the total relative movement, with a cylinder in which a piston is mounted so as to be longitudinally displaceable and forms working chambers within the cylinder on opposing end faces thereof, wherein the working chambers are variable in size as a function of the displaced position of the piston, are filled with a fluid damping medium and by way of overflow ports or channels provided in the piston and/or cylinder allow a throttled overflow of the fluid damping medium from one working chamber to the other, wherein on one face of the piston there is attached a piston rod which is guided in a sealed manner out of the associated end of the cylinder and which by way of its outer end remote from the piston transmits to the piston the movement of the furniture part to be damped or slowed, and for equalisation of the total volume of the working chambers which varies due to the volume of the piston rod as it travels in a volume equalising device is provided and the throttle cross-section of the overflow ports or channels is designed to be variable as a function of the displaced position of the piston in such a way that during the damping or slowing stroke a changing damping or slowing characteristic is produced, and the piston rod is coupled to the piston provided with overflow ports so as to be displaceable in a manner which is known per se by a predetermined longitudinal path and has in its end region facing the piston a non-return plate of reduced external diameter which is provided with overflow ports with a reduced throttle cross-section by comparison with the cross-section of the piston overflow ports, wherein during the damping or slowing working stroke the non-return plate is in sealed abutment on the facing end face of the piston, but during the return stroke it is displaced into a position spaced from the end face of the piston.

In furniture construction such damping or slowing devices serve to avoid or at least substantially reduce the stresses and noise produced during rapid vigorous closing of doors or closing of drawers of cupboards when the moving furniture part mounted on the carcass is slowed abruptly. Such damping devices which are filled with gaseous substances, such as for example atmospheric air, or viscous fluids, such as for example silicone oil, acting as damping medium are known in different designs (e.g. DE 195 22 254 A1). By comparison with the devices which operate with a gaseous damping medium the devices which operate with a fluid damping medium have the advantage that these fluid damping media are practically incompressible, so that they do not have any resilient properties which attempt to move the movable part back again somewhat out of the closed position after the closed position has been reached. Moreover, fluid dampers can be produced with comparatively smaller dimensions. The problem then occurs that the damping or slowing forces to be generated in order to damp a moving furniture part also depend upon the mass of the particular furniture part or the speed at which it is being closed.

A device of the type referred to in the introduction is described in the Patent Application 103 10 732.6, which is not prior-published, in the name of the present applicants.

The object of the invention is to make functional improvements to this device.

With a device of the type referred to in the introduction as the starting point, this object is achieved according to the invention in that between the non-return plate and the piston there is disposed a spring which biases the end faces which face one another of the non-return plate and of the piston into the position in which they are spaced from one another.

In this case the spring preferably has the shape of a disc made from resilient metal which is corrugated in the circumferential direction.

The spring can then be disposed in a space-saving manner between the end faces which face one another of the non-return plate and of the piston.

A variant is advantageous in which the piston rod is coupled to the piston provided with overflow ports so as to be displaceable in a manner which is known per se by a predetermined longitudinal path and has in its end region facing the piston a non-return plate of reduced external diameter which is provided with overflow ports with a reduced throttle cross-section by comparison with the cross-section of the piston overflow ports, wherein during the damping or slowing working stroke the non-return plate is in sealed abutment on the facing end face of the piston, but during the return stroke it is displaced into a position spaced from the end face of the piston. The effect of this is that during the damping stroke the throttle effect is produced in the overflow ports of reduced throttle cross-section of the non-return plates, whereas during the return stroke the damping medium can overflow via the overflow ports in the piston which are of larger cross-section. This means that the desired high damping effect only occurs during the working stroke, whereas no or only slight damping forces are generated during the return stroke.

In order to change the damping or slowing characteristic, at least one recessed overflow channel which extends at least in portions in the direction of travel can be provided in the internal wall of the cylinder, the cross-section of this overflow channel being constructed so as to be variable according to the desired throttle characteristic. In this case it is possible to dispense entirely with overflow ports in the non-return plate—which may be provided—or the cross-section of such overflow ports is further reduced so that damping or slowing forces which are generated only make up a part of the total damping forces due to throttling of the damping medium in the overflow ports of the non-return plate.

In this case the cross-section of the at least one overflow channel is advantageously chosen so that during the damping stroke it decreases in the longitudinal direction of the cylinder starting from the initial stroke position. As a result a damping characteristic is achieved at which the damping effect increases as the working stroke increases.

In order to ensure that when the end of the working stroke is reached no forces can occur which act on the piston rod of the damper in the sense of springing back, in a variant according to the invention the cylinder can have an enlarged diameter in an end region facing the concluding damping stroke of the piston. Thus as soon as the piston reaches this end region the damping medium can flow back unthrottled over the outer circumference of the piston and can produce an equalisation of pressure between the two working chambers.

The volume equalising device of the device according to the invention can have an equalising chamber which is connected to the working chamber of the cylinder through which the piston rod passes and which can be increased in volume by fluid pressure medium overflowing from the working chamber, the volume of the equalising chamber decreasing again as the damping medium returns to the working chamber.

In this case for the purpose of a compact construction of the device it is recommended to construct the equalising chamber in an extension of the cylinder adjoining the working chamber through which the piston rod passes.

In this case an embodiment is advantageous in which the equalising chamber is constructed as an annular chamber which is provided between an elongate guide sleeve surrounding the piston rod and the internal wall of the cylinder extension and which is filled at least for the most part by an insert which can be resiliently compressed by overflowing fluid pressure medium.

In this case the resiliently compressible insert can be constructed as an annular body which is shaped substantially corresponding to the annular chamber, has fluid-tight outer walls and within the outer wall is filled with a resiliently compressible medium, for example a closed-cell foam material made from rubber or elastomeric plastics material.

By modification of the embodiment described above in such a way that the piston is provided over at least a portion of the piston circumference with an oblique chamfer in the radially outer region of its end face directed towards the non-return plate, and that at least one recess, which is closed in the outer radial edge region opposite the inner face of the cylinder and in the radially inner region engages over a central port in the piston, is provided offset with respect to the overflow port(s) in the substantially planar end face of the non-return plate directed towards the piston, it can be ensured that an overpressure which may occur under certain operating conditions in one of the working chambers is blow off to the other working chamber and malfunctions or destruction of the device are avoided thereby.

The invention is explained in greater detail below in the following description of two embodiments in conjunction with the drawings, in which:

FIG. 7 shows a longitudinal central section through non-return plate which is modified with respect to the non-return plate of the first embodiment of the device according to the invention shown in FIGS. 1 to 6;

FIG. 8 shows a view from below of the modified non-return plate viewed in the direction of the arrow 8 in FIG. 7;

FIG. 9 shows a longitudinal central section through a modified piston of the device which co-operates with the non-return plate shown in FIGS. 7 and 8;

FIG. 10 shows a representation of a part-region of a second embodiment of the device according to the invention which corresponds to FIG. 6 in the selected detail and the operating position, with the non-return plate modified according to FIGS. 7 and 8 and with the piston shown in FIG. 9;

FIG. 11 shows a representation corresponding to FIG. 10 in which the non-return plate, the piston and the spring of the second embodiment disposed between the end faces thereof which face one another are shown in a securing position which is established when the permissible pressure in the damping medium is exceeded in one of the working chambers and in which the spring is additionally deformed by the overpressure so that it forms an overflow passage to the other working chamber; and FIG. 12 shows on an enlarged scale the part-region which is located within the dash-dot circle 12 in FIG. 11.

Figures 1, 2:
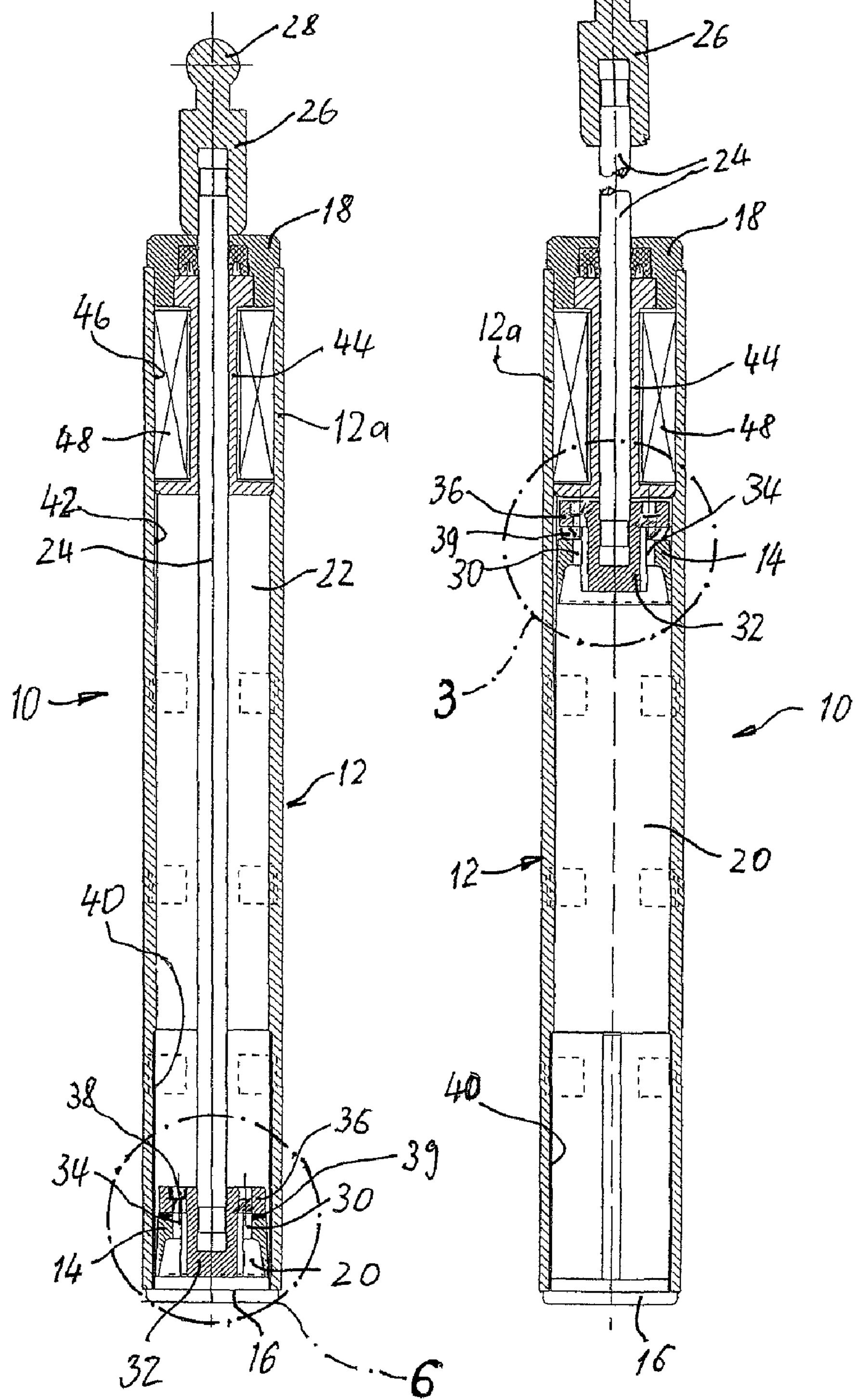
FIG. 1 shows a longitudinal central section through a first embodiment of a device constructed according to the invention for damping or slowing movable furniture parts in the end position of the piston adopted after conclusion of the damping stroke.
FIG. 2 shows a sectional view corresponding to FIG. 1 of the device in the initial position of the piston before the initiation of the damping stroke with the piston rod moved out.

The device according to the invention for the damping or slowing of movable furniture parts, e.g. drawers or door leaves, which is shown in FIGS. 1 and 2 and is denoted as a whole by 10 has a housing which is constructed as an elongate hollow cylinder 12 and in which a piston 14 is inserted so as to be longitudinally displaceable, wherein the cylinder which is closed at its end by respective end caps 16 and 18 is divided by the piston into two working chambers 20, 22 which are variable in size—as a function of the displaced position of the piston 14.

Connected to the end face of the piston 14 which is uppermost in the drawings is a piston rod 24 which passes through the working chamber 22, is guided in a sealed manner through the cap 18 and bears on its outer free end a coupling element 26 which is provided with a ball head 28 for connection to a further component which transmits the movements of a furniture part (not shown).

In this case the piston 14, which is provided with a circumferential sealing lip 29 which is formed integrally thereon and rests on the inner wall of the cylinder 12, is connected not directly but by way of a projection 32 which passes through a central port 30 in the piston 24 so as to be longitudinally displaceable to a predetermined extent, wherein channels are provided in the central port 30 and in the outer wall of the projection 32 and when combined form overflow ports 34 via which fluid damping medium contained in the working chambers 20, 22 of the cylinder can over flow from the working chamber 22 into the working chamber 20 and vice versa.

Figure 3:
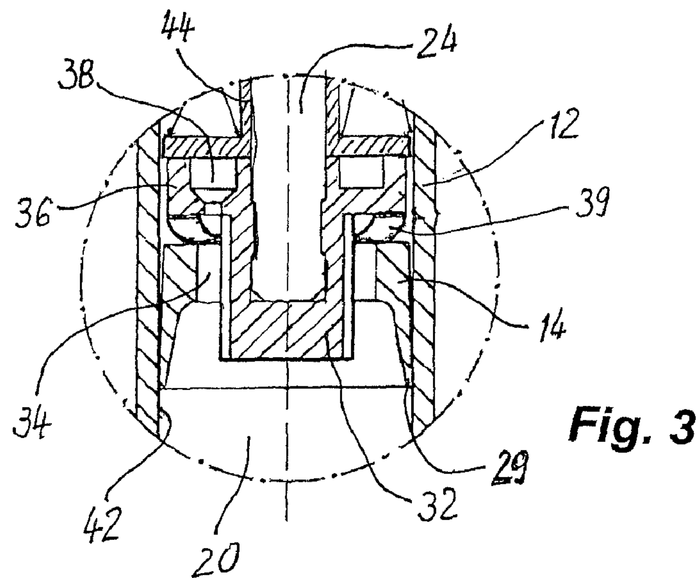
FIG. 3 shows on an enlarged scale the part-region of the device according to the invention which is located within the dash-dot circle 3.
Figure 4:
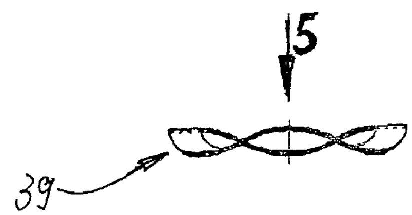
FIG. 4 shows a side view of a spring disposed in FIG. 3 between the end faces which face one another of the non-return plate and of the piston of the device.
Figure 5:
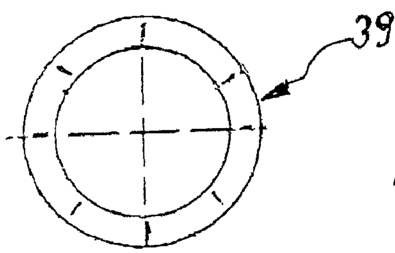
FIG. 5 shows a top view of the spring viewed in the direction of the arrow 5 in FIG. 4.
Figure 6:
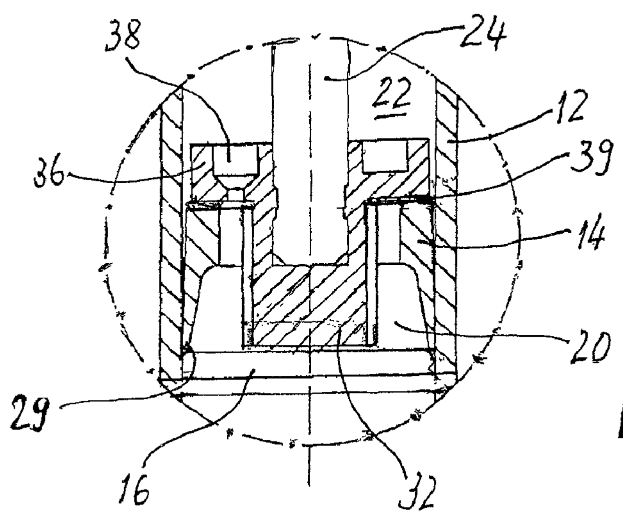
FIG. 6 shows on an enlarged scale the part-region of the device according to the invention which is located within the dash-dot circle 6.

A non-return plate 36 is integrally attached to the end of the projection 32 near the piston rod, wherein the external diameter of the non-return plate is smaller than the clear internal diameter of the cylinder 12 and is provided—in alignment with the overflow ports 34 in the piston 14—with overflow ports 38 of which the cross-section is smaller than the passage cross-section of the overflow channels 34 in the piston 14. Between the end faces which face one another of the non-return plate 36 and of the piston 14 there is disposed a spring 39 which in the illustrated case is constructed as a corrugated annular plate made from thin resilient metal and attempts to force the piston and the non-return plate apart by the dimension of the height of the corrugations of the spring measured in the longitudinal direction of the piston rod, so that between the opposing end faces of the piston and the non-return plate the spacing is established which can be seen in FIG. 2 and—in particular—on an enlarged scale in the detail of FIG. 3. During a displacement of the piston rod 24 starting from the initial position shown in FIG. 2 the non-return plate 36 presses in the downward direction onto the facing peaks of the corrugations of the spring 39, whereby the spring is deformed into a flat annular disc which then also rests in a planar manner on the end face of the piston 14. During the subsequent working stroke fluid damping medium can then only overflow in a throttled manner via the overflow ports 38 in the non-return plate 36 into the working chamber 22. Thus the total cross-section of the overflow ports 38 in the non-return plate 36 determines the throttle cross-section of the device which builds up the damping effect.

When conversely the piston rod 24 starting from the end position shown in FIG. 1 is drawn out from the cylinder, the non-return plate 36 lifts and the spring is simultaneously deformed back into the corrugation initial shape from the facing end face of the piston and the damping medium located in the working chamber 22 can also overflow via the annular gap formed between the outer circumference of the non-return plate 36 and the internal wall of the cylinder, in addition to the overflow ports 38, into the space between the cylinder 12 and the non-return plate 36 and from there it can overflow via the overflow ports 34 into the working chamber 20. Thus since the overflow ports 34 overall have a larger cross-section than the overflow ports 38, during the return stroke no or significantly lesser damping or slowing forces are transmitted to the piston rod 24.

In the end portion 40 which is lower in the drawings the cylinder 12 has an enlarged diameter so that the sealing lip 29 of the piston 14 does not rest in a sealed manner on the internal wall of the cylinder in the end portion 40, that is to say in the region of the end portion 40 fluid damping medium can also overflow over the circumference of the piston between the working chambers 20 and 22. Therefore during the displacement of the piston 14 in the end portion 40 no or only slight pressure differences can build up in the damping medium in the working chambers 20 and 22, with the result that no—or only negligibly small—damping forces are built up during the displacement of the piston 14 in the end portion 40.

In order to realise a varying damping or slowing characteristic during the working stroke, in the device 10 an overflow channel 42 extending in the longitudinal direction over part of the inner wall is machined into the inner wall in the upper end region of the cylinder 12, the cross-section of the said overflow channel being reduced from the upper end in the downward direction so that during the displacement of the piston 14 out of the initial position shown in FIG. 2 a throttle opening of reducing passage cross-section is formed which thus produces throttle forces which are variable as a function of the displaced position of the piston 14.

The volume equalising device, which is necessary for the reduction of the total volume of the working chambers 20 and 22 in the cylinder during the damping stroke due to the volume of the piston rod 24 entering increasingly into the cylinder 12, is provided in the device 10 in an integral extension 12*a* at the upper end of the cylinder. In the region of the extension 12*a* in the corresponding elongate guide sleeve 44 for the piston rod 24 and the inner wall of the extension an annular space 46 is formed into which the volume of pressure medium displaced by the piston rod 24 can overflow. In order that the damping medium which has overflowed into the annular space 46 during the insertion of the piston rod 24 can be returned again into the actual working chambers 2 and 20, the annular space 46 is filled by a shaped body 48 made from a resiliently compressible material, for example a closed-cell foam material made from rubber or an elastomeric plastics material, which compresses due to the pressure of the overflowing fluid damping medium but expands again as the volume in the working chambers 20, 22 increases due to the piston rod 24 moving out and thus the previously displaced damping medium is returned into the working chambers.

Relatively minor modifications of the non-return plate 36 and of the piston 14 of the embodiment of the device 10 according to the invention described above in conjunction with FIGS. 1 to 6 are described in FIGS. 7 to 9, and these modifications result in an additional overload safety function in the sense that in the event of an unacceptable overpressure—possibly—occurring in a working chamber an additional partial deformation of the spring 39 is possible which opens up an overflow path for the damping medium which is subject to an underpressure, and thus malfunctions or destruction of the device 10 are avoided.

The modification made to the non-return plate 36 (FIGS. 7 and 8) resides in the additional arrangement of a recess 50 in the lower end face facing the piston 14, wherein the recess is closed towards the outer edge of the plate and extends radially inwards as far as the transition region from the disc-shaped part of the non-return plate 36 to the projection 32 projecting in the direction of the piston. In this case the recess 50 provided in the underside of the non-return plate 26 is disposed in a region which is offset with respect to the overflow port or ports 38 provided in the non-return plate 36. The modification which is made to the modified piston 14 (FIG. 9) resides in the fact that the originally planar annular end face of the piston directed towards the non-return plate 36 is provided with a circumferential oblique chamfer along an outer edge region. The chamfer 52 makes it possible that when an unacceptable overpressure occurs in the working chamber 20 the resilient corrugated annular plate 39 which controls the throttle characteristic can be deformed starting from the illustration in FIG. 10, which corresponds to the position of the components in FIG. 6, according to the chamfer 52 by the overpressure in the region of the recess 50 in abutment on the chamfer, so that an overflow path for the damping medium subject to underpressure is produced between the edge of the non-return plate 36 which closes the recess externally and the upper face of the spring which is deformed into the planar form facing the said edge. This state is illustrated in FIG. 11 and—on an enlarge scale—additionally in FIG. 12.

As soon as the overpressure in the working chamber 20 has dropped to an acceptable pressure value by the overflow of the pressure medium subject to overpressure located there to the working chamber 22, the spring constructed as an annular disc deforms again into the planar state shown in FIG. 10 and an equalisation of pressure is then only still possible by way of the overflow port(s) 38 in the non-return plate 36.

The invention claimed is:

1. Device (10) for damping or slowing the movement of furniture parts, which are movable relative to immovable furniture parts, during a portion of the total relative movement, with a cylinder (12) in which a piston (14) is mounted so as to be longitudinally displaceable and forms working chambers (20; 22) within the cylinder (12) on opposing end faces thereof, wherein the working chambers are variable in size as a function of the displaced position of the piston, are filled with a fluid damping medium and by way of a piston overflow port (34) provided in the piston (14) and/or at least one recessed overflow channel (42) provided in the cylinder (12) allow a throttled overflow of the fluid damping medium from one working chamber (20; 22) to the other, wherein on one face of the piston (14) there is attached a piston rod (24) which is guided in a sealed manner out of the associated end of the cylinder and which by way of its outer end remote from the piston transmits to the piston (14) the movement of the furniture part to be damped or slowed, and for equalisation of the total volume of the working chambers (20; 22) which varies due to the volume of the piston rod (24) as it travels, a volume equalising device is provided, and the throttle cross-section of the piston overflow port (34) or the channel (42) is designed to be variable as a function of the displaced position of the piston (14) in such a way that during a damping or slowing stroke a changing damping or slowing characteristic is produced, and the piston rod (24) is coupled to a projection (32) which includes a non-return plate (36) resting on a spring (39), which rests on the piston (14), defining the piston overflow port (34) so that the piston rod (24) is displaceable by a predetermined longitudinal path, and wherein the non-return plate (36) has an external diameter smaller than an internal diameter of the cylinder (12), the non-return plate (36) defines a non-return plate overflow port (38) with a reduced throttle cross-section by comparison with the cross-section of the piston overflow port (34), wherein during the damping or slowing stroke the non-return plate is in sealed abutment on the facing end face of the piston, but during a return stroke the non-return plate is displaced into a position spaced from the facing end face of the piston, wherein the spring (39) biases the end faces which face one another of the non-return plate (36) and of the piston (14) into the position in which they are spaced from one another; the spring (39) has the shape of a disc made from resilient metal which is corrugated in the circumferential direction; wherein the piston (14) is provided over at least a portion of the piston circumference with an oblique chamfer (52) in the radially outer region of its end face directed towards the non-return plate (36), and that at least one recess (50), which is closed in an outer radial edge region opposite the internal wall of the cylinder (12) and in a radially inner region engages over a central port (30) in the piston (14), is provided offset with respect to the non-return plate overflow port (38) in a substantially planar end face of the non-return plate (36) directed towards the piston (14).

2. Device as claimed in claim 1, wherein the spring (39) is disposed between the end faces which face one another of the non-return plate (36) and of the piston (14).

3. Device as claimed in claim 1, wherein in order to change the damping or slowing characteristic, the at least one recessed overflow channel (42) extends at least in portions in the direction of travel and is provided in the internal wall of the cylinder, the cross-section of the at least one recessed overflow channel being constructed so as to be variable according to a desired throttle characteristic.

4. Device as claimed in claim 3, wherein during the damping stroke the cross-section of the at least one recessed overflow channel (42) decreases in the longitudinal direction of the cylinder starting from an initial stroke position.

5. Device as claimed in claim 1, wherein the cylinder (12) has an enlarged diameter in an end region (40) associated with a concluding damping stroke of the piston (14).

6. Device as claimed in claim 1, wherein the volume equalising device has an equalising chamber which is connected to the working chamber (22) of the cylinder (12) through which the piston rod (24) passes and which can be increased in volume by the fluid damping medium overflowing from the working chamber through which the piston rod passes, the volume of the equalising chamber decreasing again as the damping medium returns to the working chamber (22) through which the piston rod passes.

7. Device as claimed in claim 6, wherein the equalising chamber is constructed in an extension (**12*a*) of the cylinder (12**) adjoining the working chamber through which the piston rod passes.

8. Device as claimed in claim 7, wherein the equalising chamber is constructed as an annular chamber (46) which is provided between an elongate guide sleeve (44) surrounding the piston rod (24) and the internal wall of the cylinder extension (**12*a*) and which is filled at least for the most part by an insert (48**) which can be resiliently compressed by overflowing fluid damping medium.

9. Device as claimed in claim 8, wherein the resiliently compressible insert (48) is an annular body which is shaped substantially corresponding to the annular chamber (46), has fluid-tight outer walls and within the outer walls is filled with a resiliently compressible medium.

10. Device as claimed in claim 9, wherein the insert (48) is a shaped body made from closed-cell foam material.

* * * * *